Dec. 12, 1967     R. SMITH     3,357,295
SELF-TAPPING SCREWS
Filed June 2, 1965
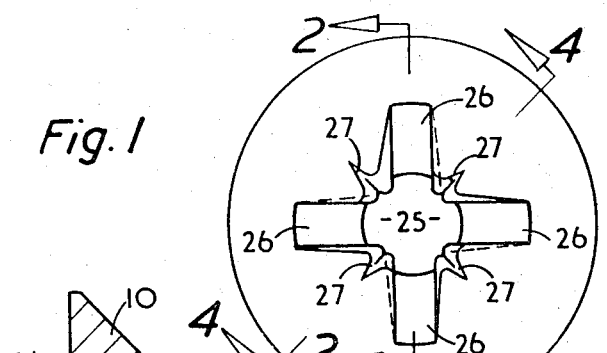
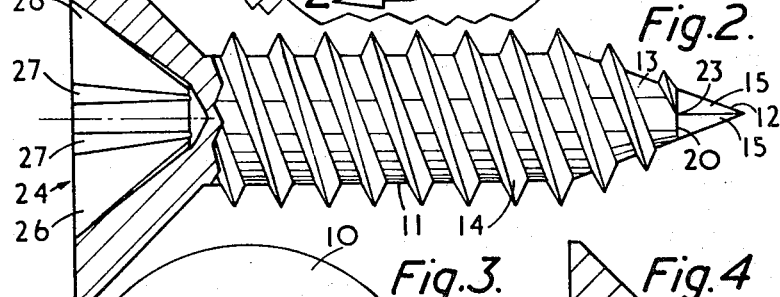
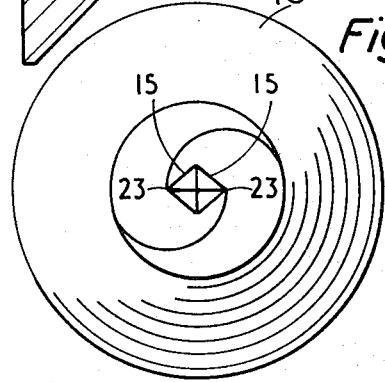
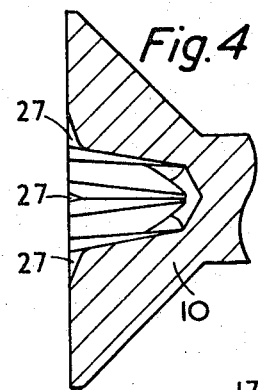
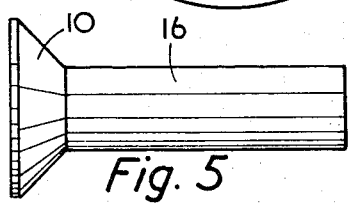
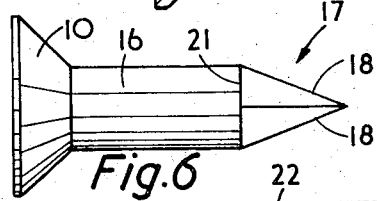
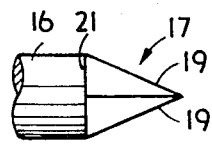
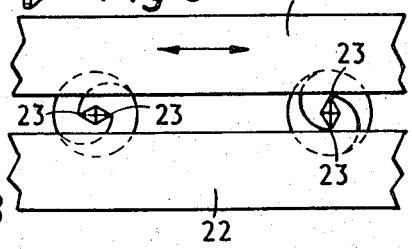
INVENTOR.
RONALD SMITH
BY Kurt Kelman
AGENT United States Patent Office 3,357,295
Patented Dec. 12, 1967

3,357,295
SELF-TAPPING SCREWS
Ronald Smith, Dudley, England, assignor to G.K.N. Screws & Fasteners Limited, Birmingham, England, a company of Great Britain
Filed June 2, 1965, Ser. No. 460,759
Claims priority, application Great Britain, Apr. 24, 1965, 17,389/65
1 Claim. (Cl. 85—41)

This invention relates to a self-tapping screw particularly intended for use with a driving tool as claimed in co-pending application No. 460,229, filed June 1, 1965, and now abandoned, or any similar tool which is adapted to apply an impact to a screw in the axial direction, to cause the point of the screw to pierce a workpiece, and also to apply torque to the screw to rotate it for the purpose of driving the screw into the workpiece.

The tool described and claimed in the aforesaid prior application has been developed specifically for the purpose of driving self-tapping screws into sheet metal components and for the assembly of parts wherein at least one part is a metal sheet.

Hitherto, the general practice when using self-tapping screws in metal sheet has been to provide pilot holes for the screws by separate punching or drilling operations, and this process has certain drawbacks, of which one is the increased cost of manufacture entailed in the separate operations of drilling or punching the pilot holes. Also, where sheet metal components are subjected to forming operations after pilot holes have been provided there can result misalignment of holes in mating components, which leads to great difficulties in the subsequent use of self-tapping screws to secure such mating components together.

In certain assembly cases it also arises that the location of the pilot holes cannot be accurately predetermined before the assembly operations are commenced, and this then means separate operations for drilling or punching pilot holes on site where the assembly is produced.

Attempts have been made to overcome these drawbacks with the provision of a self-tapping screw having a drill point which by virtue of being able to drill its own pilot hole will eliminate the necessity for separate operations to provide pilot holes, but, in the main, these self-tapping screws with drill points have not been successful, owing to the high cost of producing a satisfactory drill point on each individual screw, and also the fact that the speed of rotation required for drilling is considerably higher than the speed suitable for driving the self-tapping screw, so that, when used with power-operated screwdrivers, there is a tendency for the thread formed in the metal sheet to strip as the screw is driven in at the higher rotational speed required for the initial drilling operation.

The tool according to the aforesaid patent application and similar tools have the advantage of eliminating the necessity for providing the pilot holes and make use of a screw which does not have the disadvantage of a drill-point self-tapping screw, but to achieve optimum results with such a tool it is required to provide a screw having a point formation which will ensure that when an impact is delivered to the screw in the axial direction, it will pierce the metal sheet without tilting or moving sideways, so that it will form a true pilot hole in the desired position. It is also required to have co-operation between the form of the point and the form of the thread to ensure that the thread of the screw will immediately commence to start its tapping operation as soon as torque is applied, without any tendency for slipping or tilting of the screw in relation to the pilot hole.

The object of the invention is to provide a self-tapping screw with a point form and thread form having characteristics which co-operate to achieve these desired effects.

According to the invention, there is provided a self-tapping screw with a metal-piercing point, a head, and a cylindrical shank with a two-start thread thereon. The point is of four-sided pyramidal form with a quadrilateral cross-section, taken in any plane at right angles to the axis of the screw, which has one diagonal longer than the other. The base of the pyramidal point has a maximum diagonal dimension less than the core diameter of the thread on the cylindrical shank and is joined to the cylindrical shank by a pilot portion which tapers in cross-section from a maximum where it joins the cylindrical shank to a minimum where it joins the point, the threads being continued on to said pilot portion and being of radial depth which decreases gradually from the position of joinder between the pilot portion and the cylindrical shank down to the position of joinder between the pilot portion and the base of the point, and such threads being arranged so that the starts of the threads on the pilot portion are coincident with the opposite corners of the base of the point at the ends of its maximum diagonal dimension.

An embodiment of the invention is now described in more detail, by way of example, being particularly designed for use in the tool forming the subject of the aforesaid prior application No. 460,229, filed June 1, 1965, and now abandoned.

Such embodiment, and its method of manufacture, is illustrated in the accompanying drawings wherein:

FIGURE 1 is a plan view of the head of the screw.
FIGURE 2 is a side view of the screw, the head being shown in section on the line 2—2 of FIGURE 1.
FIGURE 3 is an end view of the point of the screw.
FIGURE 4 is a detail view of the head in section on the line 4—4 of FIGURE 1.
FIGURE 5 is a side view of a blank for forming the screw.
FIGURE 6 is a side view of the blank after the forming of the point.
FIGURE 7 is a detail view showing the point of FIGURE 6 turned 90°.
FIGURE 8 is a diagrammatic view illustrating the formation of the thread on the blank of FIGURE 6.

The screw shown in FIGURE 2 is particularly designed for use in securing together relatively thin metal sheet panels, and it comprises a head 10 of countersunk form, a cylindrical shank 11 and a point 12 at the extremity which is joined to the shank by a pilot portion 13. There is provided on the cylindrical shank 11 a two-start thread 14 having self-tapping characteristics and formed by a rolling operation performed upon a blank having an initially cylindrical shank portion.

The point 12, at the extremity of the screw, is of four-sided pyramidal form with four flat sides 15, and having a cross-section, taken in any plane at right angles to the axis of the shank 11, which is such that one diagonal of the cross-section is slightly longer than the other. This can be seen best in FIGURE 3 where it will be observed that the horizontal diagonal is slightly longer than the vertical. This form of cross-section is referred to as "diamond" form in order to distinguish it from the cross-section of a pyramidal point having a square base.

Referring to FIGURES 5 to 8, the point 12 is formed by a normal pinch pointing operation performed upon the blank shown in FIGURE 5, which blank has a cylindrical shank 16 on one end of which the head 10 is formed. The pinch pointing dies are formed so as to produce, on the shank, a point end 17 in which the apex angle, in one axial plane extending through a diagonal of the cross-section, is 40° (being the angle between lines 18 in FIGURE 6), whilst the apex angle in the plane at right angles to said first mentioned plane is 45° (being the angle between lines 19 in FIGURE 7). This gives the desired diamond cross-section for the point 12, above referred to, in the finished screw.

Referring back to FIGURE 2, at the base 20 of the pyramidal point 12 the four sides 15 of the point merge into the pilot portion 13 which extends between the base 20 of the point and the cylindrical shank 11 and has a gradually decreasing cross-section between the shank and the base 20 of the point so that it tapers smoothly from the maximum diameter of the cylindrical shank 11 down to and merging into the four flat sides 15 at the base 20 of the point. It will be observed that the maximum diagonal dimension at the base 20 of the point is less than the core diameter of the thread upon the cylindrical shank 11.

It will be observed from FIGURES 6 and 7 that, in the blank form, the diamond cross-section point, produced by the pinch pointing operation, extends from the extremity of the point right up to the commencement of the cylindrical shank 16, at the position 21, and this includes the portion of the blank point which eventually becomes the pilot portion 13 in the finished screw. The importance of this formation of the blank point will be apparent from the following description of the further operation of providing the thread 14 on the blank.

The blank provided with the point formation as above described is then used in a thread rolling operation to produce the two-start thread and this operation is illustrated diagrammatically in FIGURE 8 which represents a blank being rolled between two flat dies 22, one of which is usually a fixed die whilst the other reciprocates relatively thereto in the longitudinal direction as indicated by the arrows, in known fashion; each die has a ribbed formation on its operative surface to produce the desired thread on the blank and also, in known manner, the two dies have, adjacent one pair of longitudinally extending edges, mutually converging portions which are shaped to form the thread on the pilot portion 13. As can be seen from FIGURE 8, because the point has a diamond cross-section the two corners 23 of the point which are at the ends of the longer diagonal will be engaged by the operative surfaces of the thread rolling dies before engagement is made with the other two corners, with the result that the start of each thread will occur at one of these corners and in the finished screw in FIGURE 2, each thread starts from a corner 23 of the maximum diagonal of the point and is then formed on the pilot portion, gradually increasing in radial depth until it achieves the full depth and thread form where it extends onto the cylindrical shank. During this formation of the thread, the pilot portion 13 is formed with a smooth frusto-conical surface, as shown in FIGURE 2, and threads which gradually decrease in radial depth from the position where the pilot portion 13 joins the cylindrical shank 11 down to the position where the pilot portion joins the point at its base 20.

Hence, it will be observed that the particular diamond form of the point ensures that when the thread is rolled upon the blank the two starts (i.e. starting points) of the thread are coincident with the corners of the diamond cross-section of the point which are at the ends of the maximum diagonal. This feature is advantageous when the screw is used in a gun of the type above referred to because when the point of the screw has pierced the metal sheet the two starts of the thread are coincident with the two corners of the hole at the ends of the maximum diagonal and are immediately able to commence starting an internal threading operation without any tendency for slipping or skidding which is frequently encountered with a circular pilot hole where the threaded of the screw can skid or slip around before starting to bite into the metal. This preliminary skidding is undersirable as it can lead to tilting of the screw and a malformed internal thread. However, with the screw according to the invention, the starts of the thread are in the best position for ensuring an immediate commencement of the tapping operation and a good axially aligned lead-in for the pilot portion of the thread.

The engagement of the two starts of the thread in the manner above described also ensures accurate centering of the axis of the screw in line with the axis of the pierced hole, which facilitates the tapping of a good thread by the screw and a thread which is in correct axial alignment with the axis of the pierced hole.

Furthermore, the diamond form of the point is found to produce a better piercing action than other forms of point as the force exerted by the point upon metal sheet is principally concentrated on the two planes of shear which exend through the positions where the corners 23 of the points at the ends of the maximum diagonal, are engaging the sheet, such planes being parallel to each other and at right angles to this diagonal.

Referring now to the head 10, the form which this takes may vary from the particular countersunk form shown, by way of example, as being a screwdriver bit-engaging recess 24 of the cruciform recess type. The formation in the head for engagement with the driver bit may take many forms, or the head may be externally shaped for engagement within a driver bit of socket form.

However, for the reasons given hereinafter, it is preferred to employ a screwdriver bit-engaging recess of the form shown in the drawings.

The recess 24 comprises a central cavity 25, four radially extending grooves 26 and four valleys 27, one disposed intermediate each circumferentially adjacent pair of grooves 26, each valley extending downwardly and inwardly towards the axis of the recess and being of V form in cross-section.

The screwdriver bit for engagement with this recess is of complementary form having four wings corresponding to the grooves 26 and four V section ribs corresponding to the valleys 27. The combination between such a screwdriver bit and recess provides higher torque loading for bit-screw combination, a positive and firm engagement of the bit in the recess to eliminate any tendency for wobble of the bit when the screw is being driven and substantial elimination of any tendency for the bit to "cam" out of the recess during driving.

Further, the positive location and mechanically strong engagement between the bit of the driver and the form of recess ensures a correct alignment axially between the driver bit and the screw to guarantee that the impact applied by the tool is delivered correctly along the axis of the screw to ensure piercing of a true hole and subsequent driving of the screw with its axis maintained in true alignment with the screwdriver bit and the axis of the hole.

What I claim then is:

A self-tapping screw comprising a head, a cylindrical shank having an axis, a two-start thread extending over said cylindrical shank, a metal piercing point of four-sided pyramidal form having a base, said point also having a quadrilateral cross-section taken in any plane at right angles to the axis of said shank, said cross-section having one diagonal longer than the other and said diagonals intersecting at 90° whereby the angle included at the point in the plane of the longer diagonal is approximately 5° greater than that in the plane of the shorter diagonal, the thread on said shank having a core diameter larger than the longer diagonal dimension of the pyramidal point base, and a pilot portion joining said point to said shank, said pilot portion tapering in cross-section from a maximum where it joins the cylindrical shank to a minimum where it joins the point, the threads on the shank being continued on said pilot portion and being of a radial depth which decreases gradually from the joinder between the shank and the pilot portion down to the joinder between the pilot portion and the point, the two starts of the thread being coincident with the opposite corners of the base of the point at the ends of is longer diagonal dimension.

References Cited

UNITED STATES PATENTS

| | | | |
|---|---|---|---|
| 438,754 | 10/1890 | Rogers | 85—46 |
| 1,827,615 | 10/1931 | Rosenberg | 85—41 |
| 2,314,391 | 3/1943 | De Vellier | 85—48 |
| 3,237,506 | 3/1966 | Muenchinger | 85—45 |

FOREIGN PATENTS

| | | |
|---|---|---|
| 247,297 | 9/1963 | Australia. |
| 531,739 | 9/1954 | Belgium. |
| 1,008,781 | 2/1952 | France. |

MARION PARSONS, Jr., *Primary Examiner.*